United States Patent [19]

Snyder

[11] 4,254,325
[45] Mar. 3, 1981

[54] ELECTRIC OVEN TOASTER CONSTRUCTION

[75] Inventor: Paul V. Snyder, Whitehall, Pa.

[73] Assignee: General Electric Company, New York, N.Y.

[21] Appl. No.: 1,724

[22] Filed: Jan. 8, 1979

[51] Int. Cl.³ .............................................. A47J 37/08
[52] U.S. Cl. .................................. 219/413; 99/329 R; 339/176 P; 219/414
[58] Field of Search ............................... 219/390–399, 219/403, 404, 413, 414; 99/329 R, 385, 391, 392, 399; 339/256 SP, 258 S, 176 P

[56] References Cited

U.S. PATENT DOCUMENTS

| 1,303,464 | 5/1919 | Davis ................................. 339/176 P |
| 1,658,832 | 2/1928 | Brown . |
| 2,398,634 | 4/1946 | Geers et al. ..................... 339/176 P |
| 2,668,222 | 2/1954 | McCormick ........................ 219/403 |
| 2,704,803 | 3/1955 | Crowley et al. . |
| 2,728,832 | 12/1955 | Hoffman . |
| 2,946,974 | 7/1960 | Sias . |
| 3,119,001 | 1/1964 | Andrews ............................... 219/413 |
| 3,301,170 | 1/1967 | Beasley .................................. 99/331 |
| 3,454,744 | 7/1969 | Von Der Haar . |
| 3,728,660 | 4/1973 | Finney . |
| 4,015,093 | 3/1977 | Cote .................................... 200/51.1 |

FOREIGN PATENT DOCUMENTS 1534223 11/1978 United Kingdom .................. 99/329 R

*Primary Examiner*—B. A. Reynolds
*Assistant Examiner*—Bernard Roskoski
*Attorney, Agent, or Firm*—Leonard J. Platt; George R. Powers; John F. Cullen

[57] ABSTRACT

An electric oven toaster construction wherein a terminal assembly is provided for mounting a U-shaped temperature sensing device on an oven toaster wire rack so that the rack may be removably inserted in the oven toaster and the sensing device will be readily electrically connected in a control circuit of the oven toaster when the rack is positioned in the oven toaster.

12 Claims, 7 Drawing Figures

ELECTRIC OVEN TOASTER CONSTRUCTION

CROSS-REFERENCE TO RELATED APPLICATIONS

U.S. Pat. No. 4,135,179, filed June 1, 1977, Paul V. Snyder, "Electrical Temperature Sensing Device", assigned the same as this invention;

U.S. patent application Ser. No. 802,422, filed June 1, 1977, abandoned, Robert J. Salem, "Electronic Toast Color Sensing" assigned the same as this invention.

BACKGROUND OF THE INVENTION

1. Field of the Invention

This invention relates to an electric oven toaster, and more particularly, to a terminal assembly for mounting a temperature sensing device on an oven toaster bread rack so that the sensing device will be readily electrically connected in a control circuit of the oven toaster when the bread rack is positioned in the oven toaster.

2. Description of the Prior Art

As is well-known in the electric oven toaster art, temperature sensing devices, heat-up cool-down bi-metal timers, and other devices have been used for controlling the operation of an oven toaster. For example, as disclosed in U.S. Pat. No. 3,119,000, to J. F. Loch, et al assigned to the same assignee as the present invention, a heat responsive member 98 is positioned within an oven toaster for sensing the surface temperature of bread or other food in order to control the operation of the oven toaster. As shown in FIG. 7 of the patent, the heat responsive member 98 is permanently located within the oven toaster below a food supporting rack 25.

It is also well-known in the electric oven art to provide temperature sensing devices which are used adjacent to racks in ovens and are energized through electric leads extending through a wall of the oven. Most of these temperature sensing devices are inserted in meat or other food, and, for example, such prior art devices are disclosed in U.S. Pat. No. 2,820,130 to S. T. Dadson, U.S. Pat. No. 2,907,859 to Walkoe, and U.S. Pat. No. 2,890,429 to H. I. Baker. Some of the referenced patents include arrangements for removing the temperature sensing probes from the oven and as shown in the patent to Dadson a terminal plug 112 and a receptacle 114 are provided for this purpose.

In a prior patent to Beasley, U.S. Pat. No. 3,301,170 a thermostat sensing element 45 is connected to a grid member 40. The sensing element 45 is connected by a capillary tube 51 to a thermastatic control which is positioned within the housing 10.

In my co-pending application, (6D-5107) U.S. patent application Ser. No. 802,423, filed June 1, 1977, now U.S. Pat. No. 4,135,179 and assigned to the same assignee as the present invention, there is disclosed an electrical temperature sensing device 19 for an electrical oven toaster. The temperature sensing device is in the form of an elongated tubular structure shaped in a U-configuration, comprising a central core of insulating material upon which is wound a helical wire of temperature sensitive resistance material. A thin walled sleeve of insulating material fits tightly over the wire wound core, and a thin walled metal tubing of good heat conduction characteristics fits tightly over the insulating sleeve.

This invention is concerned with such a temperature sensing device, and more particularly to a unique construction for mounting the temperature sensing device on a removable oven toaster bread rack so that the sensing device will be readily electrically connected in a control circuit of the oven toaster when the bread rack is positioned in the oven toaster.

SUMMARY OF INVENTION

In accordance with one of the aspects of this invention an electric oven toaster includes a cooking chamber having an opening. Electric heating units are mounted at suitable locations in the cooking chamber and a removable rack is provided for supporting bread or other food to be cooked. A temperature sensing device having two output terminals is connected to the rack and a unique arrangement is provided for electrically connecting the temperature sensor to the toaster control circuit. A terminal board is provided for holding the output terminals and electrically connecting the sensing device to an electric receptacle that is positioned on a wall of the oven chamber. The terminal board includes a pair of sheet metal conductors that are separated from each other by an intermediate layer of insulating material. One terminal of the temperature sensing device is connected to one of the sheet metal conductors and the other terminal of the temperature sensing device is connected to the other sheet metal conductor. The terminal board is mounted on the rack so that a portion of the board extends outwardly from the rack for connection with a pair of conductors in the electrical receptacle that is mounted on the wall of the oven chamber.

With this construction, when the bread rack is inserted within the oven toaster the outwardly extending terminal board will be readily moved within the receptacle and one of the sheet metal conductors will be moved into contact with one of the conductors of the receptacle while the other sheet metal conductor is moved into contact with the other conductor of the receptacle.

Moreover, with this construction the temperature sensing device and the rack may be readily removed from the oven toaster for improved cleanability. With the rack and sensor removed, the inside of the oven toaster may be readily cleaned without any possibility of damaging the temperature sensing device. In addition, the temperature sensing device is readily viewable on the rack and thus, the sensing device and the rack may be easily cleaned after the rack has been removed from the oven toaster without damaging the sensor.

In addition, with such a construction a housing may be readily provided to protect the terminals and the terminal board. Suitable gaskets may be positioned between the temperature sensing device and the housing, and the outwardly extending portion of the terminal board and the housing. Thus, the terminal board and the terminals of the temperature sensing device may be sealed against water to protect the internal electrical connections when the rack is being washed.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
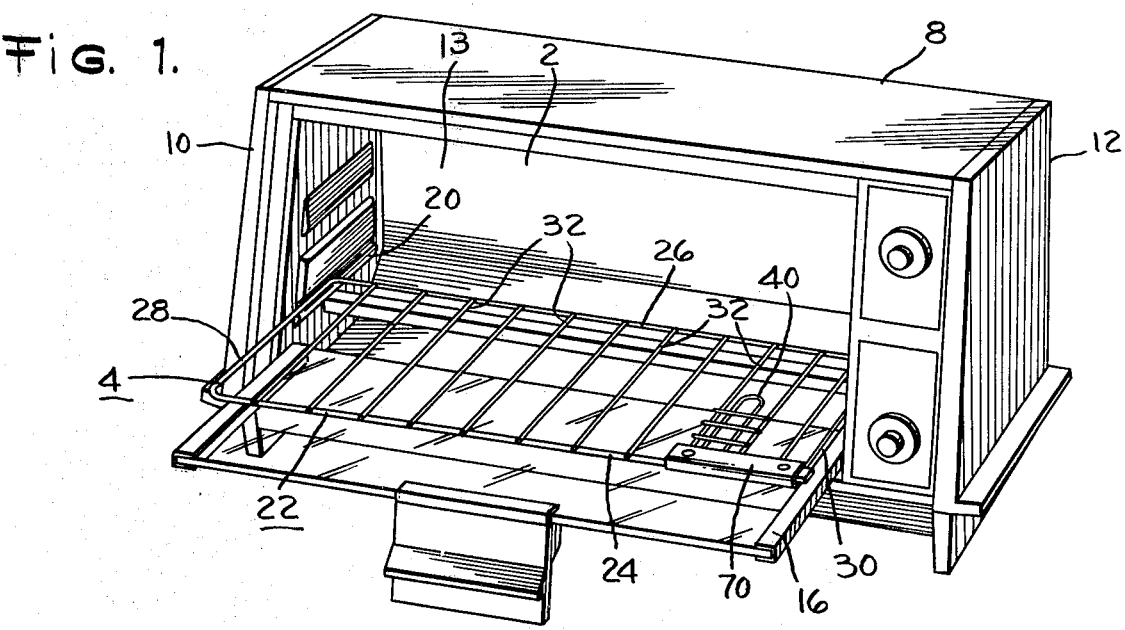
FIG. 1 is a front perspective view of an electric oven toaster with an improved terminal assembly for mounting a temperature sensing device in accordance with my invention.
Figure 7:
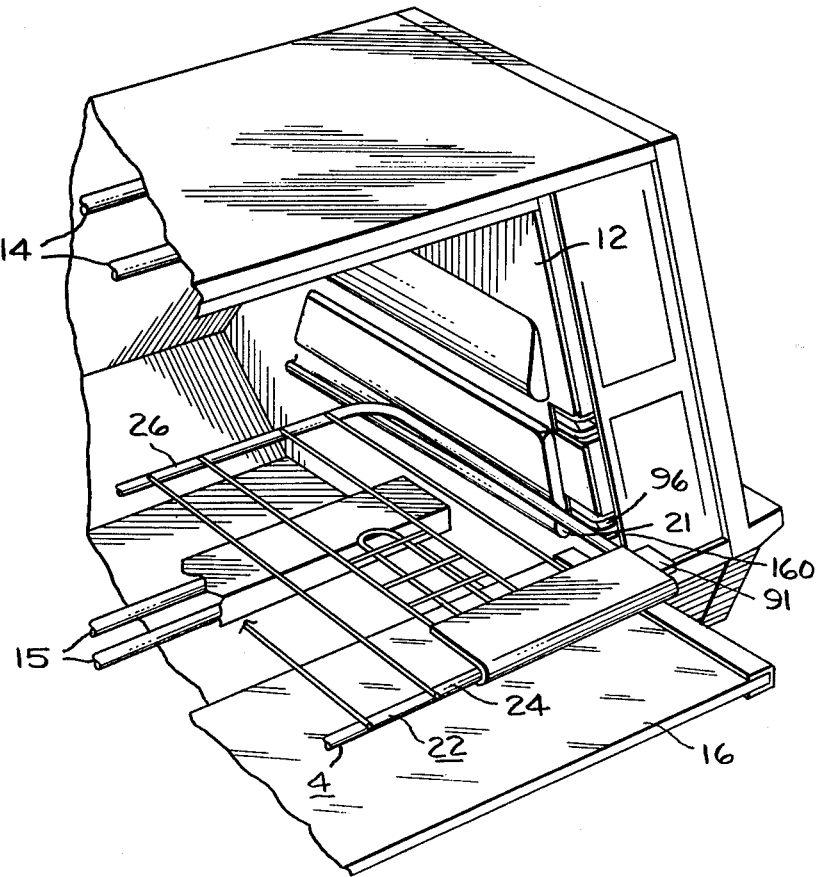
FIG. 7 is a fragmentary perspective view of the right portion of the oven toaster shown in FIG. 1.

Referring now to the drawing and first particularly to FIGS. 1 and 7, there is shown an electric oven toaster which includes a toasting and oven chamber 2 in which is mounted a generally horizontal rack 4 for supporting bread or other food to be toasted or cooked. The oven toaster includes a generally horizontal top wall 8, generally parallel vertical side walls 10 and 12, and a front opening 13 to provide access to the inside of the oven toaster. The oven toaster also conventionally includes an upper electric heating element 14 and a lower heating element 15. A front door 16 is provided for closing the front opening 13.

As shown more particularly in FIGS. 1 and 7, the food rack 4 is constructed to be removably mounted on guide rails 20 and 21 that are provided on the inside of the side walls 10 and 12, respectively. The rack may be conventionally formed from a plurality of generally parallel wires that are connected to each other. In the preferred embodiment illustrated, a rather substantial outer frame wire 22 is formed to include a front portion 24, a rear portion 26, and two side portions 28 and 30. It can be appreciated that the side portions 28 and 30 of the wire rack may be positioned for slideable movement on the guide rails 20 and 21. A plurality of relatively thin generally parallel wires 32 extend from front to rear between the front wire 24 and the rear wire 26.

Figure 2:
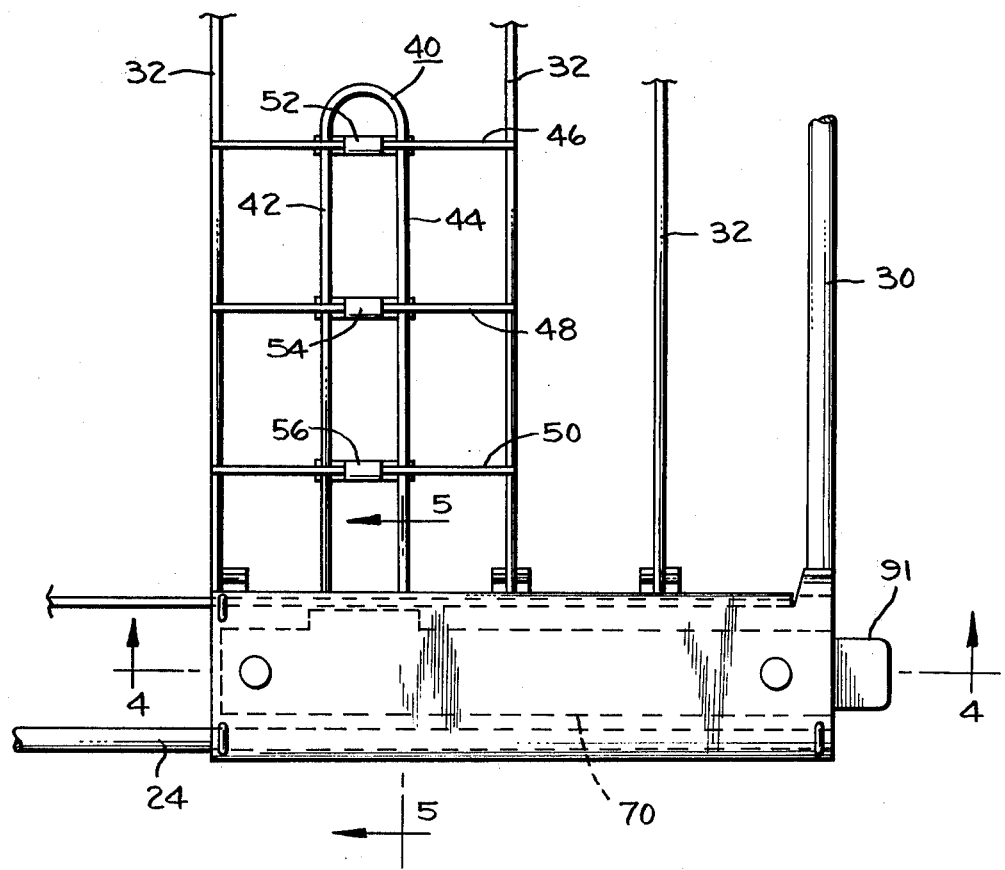
FIG. 2 is a fragmentary top plan view of a portion of the oven rack shown in FIG. 1.
Figure 3:
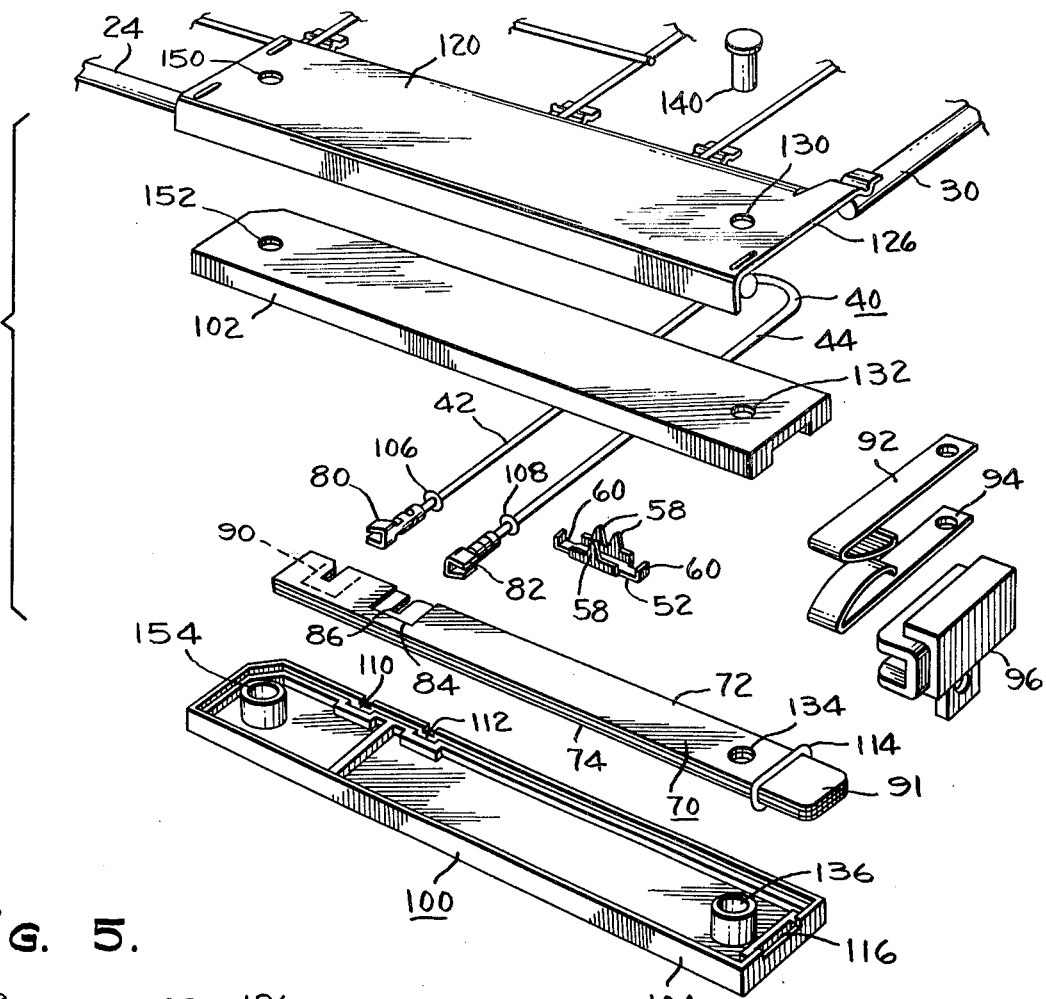
FIG. 3 is a fragmentary exploded perspective view of a portion of the parts illustrated in FIG. 1.

In accordance with the instant invention, a U-shaped temperature sensing device 40 has been uniquely positioned with respect to the rack 4 and a terminal board 70 so that the temperature sensing device will be connected in a toaster oven control circuit whenever the rack 4 is positioned within the oven toaster. As shown in FIG. 2, three generally parallel wires 46, 48 and 50, and three supporting members 52, 54 and 56, are provided for holding the sensor member 40 underneath the wires 46, 48 and 50. As shown in FIG. 3, the support members 52, 54 and 56 include crimp tabs 58, for gripping the parallel wires 46, 48, and 50 and lower members 60 for sandwiching the temperature sensing device 40 between the lower members 60 and the wires 46, 48 and 50. As shown, the temperature sensing device 40 is located a short distance from the right side guide wire 30 and an even shorter distance from the front wire 24 so that it may be readily connected to a terminal board 70.

The details of the temperature sensing device 40 do not form a part of this invention, and are described and illustrated in greater detail in my co-pending U.S. patent application (6D-5107), Ser. No. 802,423, now U.S. Pat. No. 4,135,179, assigned to the same assignee as the present invention.

TERMINAL BOARD ASSEMBLY

Figure 5:
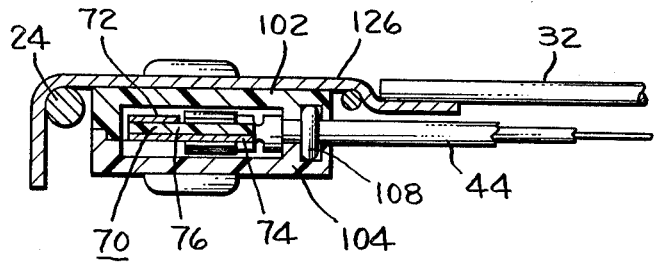
FIG. 5 is a fragmentary cross-sectional view taken substantially on the plane of 5—5 FIG. 2.
Figure 4:
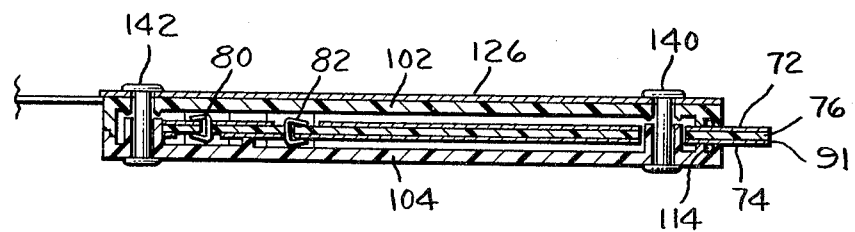
FIG. 4 is a fragmentary cross-sectional view of the terminal assembly taken substantially on the plane of 4—4 of FIG. 2.

According to my invention, there is uniquely combined with the aforedescribed temperature sensing device 40 and bread rack 4, a terminal board 70 for electrically connecting the temperature sensing device 40 to the oven toaster control circuit. As shown in FIGS. 2, 3, and 5, the terminal board 70 is positioned between the front wire 24 and the forwardly extending legs 42 and 44 of the temperature sensing device. The terminal board is generally rectangular in shape and includes a generally rectangular upper sheet metal conductor 72, a lower sheet metal conductor 74, and an intermediate layer of insulating material 76.

Terminals 80 and 82 are formed on the end portions of the U-shaped temperature sensing device for connecting the temperature sensing device to the terminal board. As shown, an enlarged notch 84 is formed through the lower sheet metal conductor and the layer of insulating material 76 for permitting the terminal 82 to be crimped to the lower sheet metal conductor 74 without shorting out the upper sheet metal conductor 72. In a like manner, an enlarged notch 90 is formed in the lower sheet metal conductor 74 for permitting terminal 80 to be crimped to the upper sheet metal conductor without shorting out the lower conductor. Thus, the temperature sensor 40 is readily connected to the terminal board. The terminal board 70 is positioned on the rack 4 so that a right portion 91 of the board extends outwardly from the side wire 30 of the rack for unique sideways connection with conductors 92 and 94 that are located in an electrical receptacle 96.

In accordance with my invention, an insulated housing 100 is provided for the terminal board in order to protect the terminals 80 and 82 of the temperature sensing device 40 and the terminal board 70. As shown more particularly in FIG. 3, the housing 100 includes an upper member 102, and a lower member 104. The terminal board 70 and the terminals 80 and 82 are positioned in the housing so that they are sandwiched between the upper member 102 and the lower member 104. Gaskets 106 and 108 may be positioned over the end portions of the temperature sensing device in the vicinity of the terminals and 80 and 82 for cooperation with suitable pockets 110 and 112 that are provided in the upper and lower members of the housing for sealing the terminals and the connections from water. In a similar manner, a gasket 114 may be positioned over the right end portion 91 of the terminal board for cooperation with pockets 116 in the upper and lower members for sealing the portion of the terminal board that is located inside the housing from water.

With particular reference to FIG. 3, it can be seen that the front right portion of the rack 4 is provided with a sheet metal plate 120 for completing the rack, protecting the terminal board 70 and the terminal board housing 100, and connecting the terminal board to the rack. As shown, the sheet metal plate 120 may be connected to the side wire 30 and the front wire 24 with a space 126 provided between the ends of the wires for receiving the terminal board housing 100. Suitable apertures 130, 132, 134 and 136 are provided at the right side portions of the sheet metal plate 120, upper housing 102, terminal board 70, and lower housing 104, respectively, for receiving a water tight rivet 140 in order to connect the parts to each other. In like manner, apertures 150, 152, and 154 are provided in the left portion of the sheet metal plate 120, upper member 102, and lower member 104 for receiving a rivet 142.

RECEPTACLE

With particular reference to FIG. 7, it can be seen that the right side wall 12 of the oven toaster is notched at 160 for receiving the electrical receptacle 96. As shown, the electrical receptacle 96 is uniquely combined with the rack 4, the rack guide 21 and the outwardly extending portion of 91 of the terminal board so that it is generally parallel to the guide 21 and is positioned slightly lower than the guide in order to readily receive the end portion 91 of the terminal board in a sideways fashion whenever the rack is positioned within the oven toaster. The receptacle includes two spring metal blade contactors 92 and 94 which are shown in FIG. 3 as being bent upon themselves so that they are resiliently urged toward each other. In this way, the contactors will maintain the circuit shown in FIG. 6 closed even though the terminal board 70 has been removed from the receptacle. Moreover, with the contactors being resiliently urged toward each other a good wiping action occurs whenever the outwardly extending portion 91 of the terminal board is moved between the contactors. Thus, any debris that may be present on the terminal board or the contactors will be wiped away in order to obtain good electrical contact.

CONTROL CIRCUIT

Figure 6:
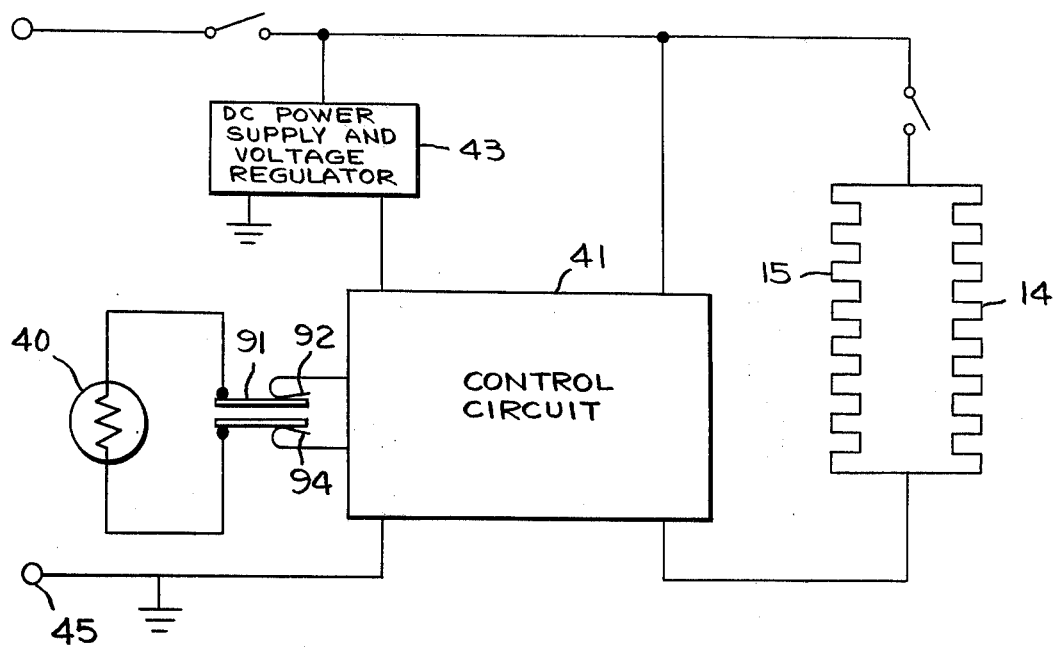
FIG. 6 is a schematic circuit diagram of the oven toaster electric circuit.

As shown more particularly in FIG. 6, the temperature sensing device 40 is removably connected to a control circuit 41 for the electric heating elements 14 and 15 of the oven toaster. One side of the control circuit 41 is connected to a DC power supply and voltage regulator 43 while the other side of the control circuit is connected to a grounded terminal 45. The details of the control circuit 41 do not form a part of this invention, and are described and illustrated in greater detail in a co-pending application of Robert Salem (6D-5291) U.S. patent application Ser. NO. 802,422, now abandoned, assigned to the same assignee as the present invention.

With this construction, the bread rack 4 and the temperature sensing device may be readily inserted within the oven toaster and removed from the oven toaster with a minimal amount of effort. All that is really necessary is that the rack be positioned on guide ways 20 and 21, and slid rearwardly. The outwardly protruding end 91 of the terminal board is positioned with respect to the receptacle 96 so that it will be naturally moved into the receptacle as the rack is moved rearwardly. Alignment of the terminal board 70 with the receptacle 96 is not critical.

With the rack and temperature sensing device removed, the inside of the oven toaster may be readily cleaned without any possibility of damaging the temperature sensing device. In addition, the temperature sensing device is readily viewable on the rack and thus, the sensing device and the rack may be easily cleaned after the rack has been removed from the oven toaster without damaging the sensor.

In view of the foregoing, it can also be appreciated that my improved terminal assembly may be readily constructed with relatively few parts. Terminals and gaskets are positioned on the temperature sensing device 40, the terminals are slipped on to the terminal board 70 and the terminal board and the sensor are sandwiched between an upper housing member 102 and a lower housing member 104. Assembly is completed by riveting the parts to a sheet metal plate 120 that forms part of the bread rack 4. Thus, a rugged terminal board and rack assembly is provided that is capable of withstanding reasonable handling and abuse. Moreover, an exceedingly simple and reliable assembly is achieved with the use of relatively few parts.

What I claim is:

1. An electric cooking appliance comprising:
   (a) wall means, including side walls, forming a chamber having an opening;
   (b) electric heating means mounted in said chamber, said electric heating means being connected to a control circuit for energizing and de-energizing the electric heating means;
   (c) a rack positioned in said chamber;
   (d) a temperature sensing device connected to said rack, said temperature sensing device including two output terminals;
   (e) a terminal board connected to said rack adjacent to the output terminals, said terminal board including a pair of sheet metal conductors separated from each other by an intermediate layer of insulating material, one of the terminals of said temperature sensing device being connected to one of the sheet metal conductors and the other terminal of said temperature sensing device being connected to the other one of said sheet metal conductors, said terminal board including a portion extending outwardly from said rack;
   (f) an electrical receptacle secured to one of said side walls for receiving the outwardly extending portion of said terminal board, said electrical receptacle including a pair of contactors electrically connected to said control circuit so that one of said sheet metal conductors will be moved into contact with one of said contactors and the other sheet metal conductor will be moved into contact with said other contactor when the terminal board is received by said electrical receptacle whereby said temperature sensing device may be readily inserted within the control circuit of said appliance for controlling energization of the heating means when the rack is inserted within the appliance.

2. An electric cooking appliance as defined in claim 1 wherein, the terminal board is generally rectangular in shape and is positioned at a front corner of said rack with a portion extending outwardly from a side of the rack so that the terminal board may be held as the rack is positioned within the oven toaster and the outwardly extending portion of the terminal board is readily viewable as it is inserted within the receptacle that is positioned on the side wall of the oven toaster.

3. An electric cooking appliance as defined in claim 1 wherein the temperature sensing device is generally U-shaped and is positioned on the rack with the legs of the U extending generally parallel to each other and the output terminals extending forwardly and connected to a rear portion of said terminal board.

4. An electric cooking appliance as defined in claim 1 wherein the electrical receptacle includes a housing formed of insulating material and the wall means of said electric cooking appliance includes a side wall having a front recess for receiving the insulating housing of said receptacle.

5. An electric cooking appliance as defined in claim 4 wherein the said wall means of said chamber includes guide means extending from front to rear for receiving a side of said rack, said receptacle being positioned generally parallel to said guide means so that the outwardly extending portion of the terminal board may be readily moved within the receptacle as the side of the rack is slid on the guide means.

6. A terminal assembly for mounting a temperature sensing device having two terminals on an oven toaster wire rack so that the rack may be readily removably inserted in the oven toaster and the sensing device will be readily electrically connected in a control circuit of the oven toaster whenever the rack is positioned in the oven toaster comprising:
 (a) an oven toaster wire rack;
 (b) a temperature sensing device, having two terminals, said temperature sensing device being secured to said rack;
 (c) a terminal board including a pair of sheet metal conductors separated from each other by a sheet of insulating material, first means for electrically connecting one of said terminals of said temperature sensing device to one of said sheet metal conductors and second means for electrically connecting the other of said terminal of said temperature sensing device to said other sheet metal conductor;
 (d) an insulating housing including an upper member and a lower member formed of insulating material, said terminal board and the terminals of said temperature sensing device, when connected to said respective sheet metal conductors, being positioned in said housing, whereby the temperature sensing device is held between said upper member and said lower member, and extends outwardly from said housing onto said rack, and the terminal board extending outwardly from said housing and said rack so that it may be removably connected in the control circuit.

7. A terminal assembly as defined in claim 6 wherein the upper sheet metal conductor is provided with an enlarged notch in the vicinity of the connection of the lower sheet metal conductor with one of the terminals of said temperature sensing device and the lower sheet metal conductor is provided with an enlarged notch in the vicinity of the connection of the upper sheet metal conductor with the other terminal of the temperature sensing device in order to prevent the terminals from shorting out.

8. A terminal assembly as defined in claim 6 wherein gaskets are provided on the temperature sensing device in the vicinity of its terminals and pockets are formed in the upper and lower members of said insulating housing for receiving said gaskets in order to seal the housing from water.

9. A terminal assembly as defined in claim 6 wherein a gasket is positioned over the terminal board and pockets are formed in the upper and lower members of the insulating housing for receiving said gasket in order to prevent water from entering the housing in the vicinity of outwardly extending portion of the terminal board.

10. A terminal assembly as defined in claim 6 wherein a generally rectangular sheet metal plate is connected to a front side portion of said rack, apertures are provided in said sheet metal plate, the insulating housing is positioned below said sheet metal plate, and water tight rivets extend through the insulating housing and said sheet metal plate in order to securely connect the insulating housing and terminal board to the underside of said rack so that they may be protected from damage from food or food containers that maybe placed on the rack.

11. In an electric oven toaster having a control circuit for energizing and de-energizing electric heating means, a temperature sensing device having two terminals, and a wire rack for supporting bread or other food, the improvement comprising:
 (a) a terminal board including a pair of sheet metal conductors separated from each other by a sheet of insulating material, one terminal of said temperature sensing device being electrically connected to one of said sheet metal conductors and the other terminal of said temperature sensing device being electrically connected to said other sheet metal conductor;
 (b) an insulating housing including an upper member and a lower member formed of insulating material, said terminal board and the terminals of said temperature sensing device being positioned in said housing, the temperature sensing device extending outwardly from said housing onto said rack, and the terminal board being sandwiched between said upper member and said lower member and extending outwardly from said housing and said rack so that it may be removably connected in the control circuit of said oven toaster.

12. An electric oven toaster comprising:
 (a) wall means forming a cooking and toasting chamber having a front opening;
 (b) electric heating means mounted in said chamber, said electric heating means being connected to a control circuit for energizing and de-energizing the electric heating means;
 (c) a generally horizontal rack for supporting bread or other food positioned in said cooking chamber, said rack being formed of a plurality of generally parallel wires that extend from the front to the rear of the rack connected to wires that extend generally perpendicular thereto;
 (d) a U-shaped temperature sensing device, said temperature sensing device including a wire of temperature sensitive resistance material, a sleeve of insulating material fitted over the wire of temperature sensitive resistance material, an outer sleeve fitted over the insulating sleeve, and two output terminals connected to end portions of the wire of temperature sensitive resistance material, said U-shaped temperature sensing device being connected to said rack with the legs of the U extending generally parallel to said generally parallel wires and the output terminals extending generally forwardly;
 (e) a generally rectangular terminal board positioned in front of said U-shaped temperature sensing device said terminal board including a pair of sheet metal conductors separated from each other by an intermediate layer of insulating material, one of the terminals of said temperature sensing device being connected to one of the sheet metal conductors and the other terminal of said temperature sensing device being connected to the other one of said sheet metal conductors, said terminal board including a portion extending outwardly from the side of said rack; and
 (f) an electrical receptacle positioned on said wall means for receiving the outwardly extending portion of said terminal board, said electrical receptacle including a pair of contactors electrically connected to said control circuit and resiliently urged toward each other so that one of said sheet metal conductors will be moved into contact with one of said contactors and the other sheet metal conductor will be moved into contact with said other contactor when the terminal board is received by said receptacle whereby the temperature sensing device may be readily inserted within the control circuit of said appliance for controlling energization of the heating means when the rack is inserted within said appliance.

\* \* \* \* \*